H. D. WILLIAMS.
INTERNAL GEAR.
APPLICATION FILED DEC. 4, 1917.

1,313,035.

Patented Aug. 12, 1919.

Inventor
HARVEY D. WILLIAMS
By        Attorney
John Lotka

UNITED STATES PATENT OFFICE.

HARVEY D. WILLIAMS, OF WALLINGFORD, CONNECTICUT, ASSIGNOR TO GEAR IMPROVEMENT COMPANY, INC., OF NEW YORK, N. Y., A CORPORATION OF NEW YORK.

INTERNAL GEAR.

1,313,035.     Specification of Letters Patent.     Patented Aug. 12, 1919.

Application filed December 4, 1917. Serial No. 205,327.

*To all whom it may concern:*

Be it known that I, HARVEY D. WILLIAMS, a citizen of the United States, and resident of Wallingford, in the county of New Haven and State of Connecticut, have invented certain new and useful Improvements in Internal Gears, of which the following is a specification.

My present invention relates to that form of toothed gear wheels known as internal gears. The principal object is to provide gears with teeth having improved operating relation through the co-acting of their surfaces, and also of greater strength.

I find that my improved tooth forms secure the advantage of a longer arc of contact between the opposing teeth of mating gears, and also avoid much of the common difficulty arising from undercutting in teeth designed according to other systems. At the same time I provide teeth which may easily be cut with accuracy.

It is well known that different co-acting tooth forms or "odontoids" are characterized in operation by different lines of action or paths of the points of contact. In the case of internal gears I have found that the path of the actual point of contact which affords the mose favorable arc of contact (as also other advantages), is as near as may be practicably determined a circular arc which crosses the pitch lines of the gears.

I find that when an internal gear wheel has teeth with straight line profiles and the other wheel of the pair has teeth of curved profiles of conjugate form, there results such desired practically circular path of the point of contact between them. The straight line tooth profile then becomes, at the instant axis, radial or normal to the arc of the said path. This profile, at the instant axis, therefore coincides, or is in line, with a radius or a normal of said arc.

Figure 1:
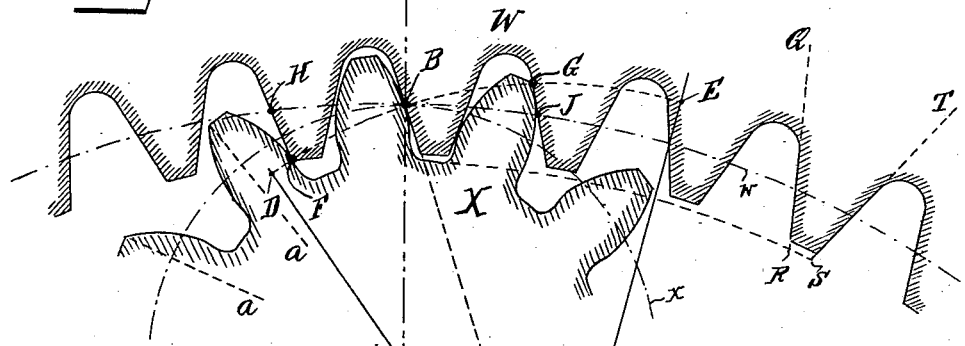
Figure 2:
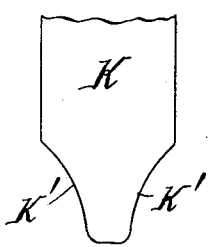
Figure 2:
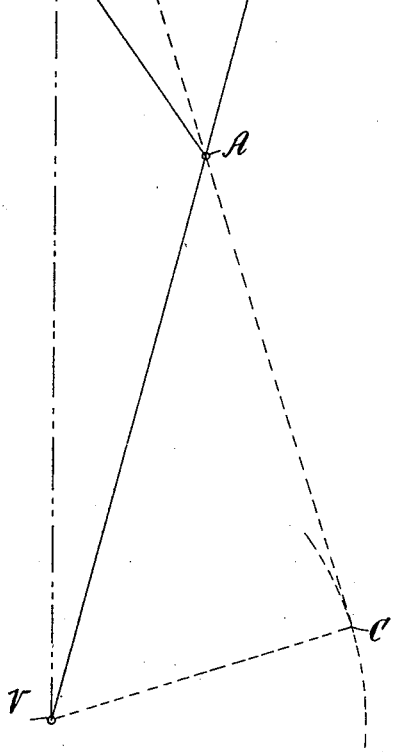

Reference is to be had to the accompanying drawings, in which Figure 1 is a diagrammatic view showing two meshing spur gears embodying my invention, and Fig. 2 is a face view showing a tool for cutting the teeth of the smaller gear shown in Fig. 1.

Fig. 1 shows one form of my improved teeth on an internal gear W and mating pinion X which latter may be regarded as the driving wheel. The centers of these gears are V, U, respectively. The line B, U, V through the wheel centers passes through the instant axis of the gears. At the desired angle the line B, C is drawn to meet a line normal to it from the center V. B, C is bisected at A, which is substantially the center of the arc of the path of the point of contact, D, B, E, also referred to as the line of action of the gears. The used portion of arc is shown as F, B, G. It is to be noted that the arc of contact H, B, J is twice the pitch arc, H, B, or B, J. The line $w$ is the pitch line of the internal gear W, and the line $x$ is the pitch line of the pinion X. The center A of the arc F, B, G, is to one side of the line B, U, V passing through the centers of the two gears, and lies within the outline or within the pitch circle $w$ of the larger gear W. The triangle B, V, C is a right-angled triangle the hypotenuse whereof, B, V, terminates at the instant axis and at the center of the larger gear while the angle between said hypotenuse and the side B C meeting it at the instant axis, is equal to the angle between the profile line of said larger gear and a radius of said gear at such profile line; and the center A of the arcuate path is, as stated, at the center of said side B C passing through the instant axis.

The curved pinion teeth may be generated by a tool of the form Q, R, S, T, while the pinion blank and tool are rolled simultaneously on their respective pitch lines $x$ and $w$.

Instead of generating the pinion teeth, I may first generate, in the same manner, by means of the tool Q, R, S, T, a pattern having substantially the shape of a tooth-space portion of the pinion, say the portion between the dotted lines $a$—$a$ of Fig. 1, and then produce from such pattern by molding or otherwise, a reverse tool K such as shown in Fig. 2, the said tool thus being of such a form that its cutting edges K′ will conform exactly to one of the tooth spaces of the pinion. Obviously, the pinion teeth may then be formed by means of such a tool or cutter K without generation, say by a reciprocating movement of the tool lengthwise of the pinion blank axis, while the pinion blank is held stationary. It is obvious that the plane tooth surfaces of the internal gear W may be cut with greater facility and accuracy than teeth having any curved profile. These teeth may be cut by a reciprocating tool as just referred to in connection with the pinion teeth, or the tooth surfaces of the two gears might be produced by broaching, casting, or other suitable methods.

Various modifications may be made without departing from the nature of my invention as defined in the appended claims.

I claim:

1. Internal gearing comprising a pair of mating gear wheels having teeth of conjugate form, the working tooth profiles of one of which wheels when at the instant axis of the gears are radial to an arc which is the path of the point of contact of the two gear wheels.

2. Internal gearing comprising a pair of mating gear wheels the working tooth profiles of one of which wheels when at the instant axis of said wheels are normal to a curve which is the path of the point of contact of the teeth of the two wheels.

3. A pair of gear wheels the center of one of which is within the circumference of the other, said wheels being provided with working tooth surfaces the point of contact of which, during operation, travels in the arc of a circle which crosses the pitch lines of the gears.

4. A pair of mating internal gear wheels having opposing tooth surfaces the contact path of which, during operation is approximately the arc of a circle which crosses the pitch lines of the two gear wheels.

5. An internal gear having teeth of straight line profile in combination with a mating gear wheel having teeth of curved profile of such conformation as in operation to make contact with the teeth of the internal gear along a curved path which crosses the pitch lines of the two wheels.

6. A pair of mating gear wheels having teeth of such conformation that in meshing operation they engage each other along a path which is the arc of a circle the center of which circle is, together with the center of one of the said wheels, located within the pitch circle of the other wheel.

7. A pair of gear wheels the center of one of which is within the circumference of the other, said wheels being provided with opposing tooth surfaces the contact path of which, during operation, is approximately the arc of a circle the center of which lies within such circumference and to one side of the straight line connecting the centers of the two wheels.

8. An internal gear having teeth of straight-line profile, in combination with a mating gear wheel having teeth of curved profile of such conformation as in operation to make contact with the teeth of said internal gear along a path which is approximately the arc of a circle having its center at the center of a straight line passing through the instant axis and forming one of the sides of a right-angled triangle the hypotenuse of which terminates at said instant axis and at the center of said internal gear, the angle between said side and said hypotenuse being equal to the angle between the straight profile line of the internal gear and a radius of said gear at such profile line.

In testimony whereof I have signed this specification.

HARVEY D. WILLIAMS.